US012259957B1

(12) United States Patent
Lyle et al.

(10) Patent No.: US 12,259,957 B1
(45) Date of Patent: Mar. 25, 2025

(54) AUDIO FEEDBACK-BASED VIDEO AUTHENTICATION METHOD AND SYSTEM

(71) Applicant: UIPCO, LLC, San Antonio, TX (US)

(72) Inventors: Ruthie D. Lyle, Durham, NC (US); Snehal Desai, Richardson, TX (US); David Joaquin Harris, San Antonio, TX (US); Eric David Schroeder, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 287 days.

(21) Appl. No.: 17/822,446

(22) Filed: Aug. 26, 2022

Related U.S. Application Data

(60) Provisional application No. 63/239,036, filed on Aug. 31, 2021.

(51) Int. Cl.
*G06F 21/32* (2013.01)
*G06F 21/31* (2013.01)
*G06V 40/16* (2022.01)
*G10L 25/51* (2013.01)

(52) U.S. Cl.
CPC .............. *G06F 21/32* (2013.01); *G06F 21/31* (2013.01); *G06V 40/161* (2022.01); *G10L 25/51* (2013.01)

(58) Field of Classification Search
CPC ....... G06F 21/32; G06F 21/31; G06V 40/161; G10L 25/51
See application file for complete search history.

(56) References Cited

U.S. PATENT DOCUMENTS

| | | | | |
|---|---|---|---|---|
| 2014/0310739 | A1* | 10/2014 | Ricci | G08B 21/0205 725/75 |
| 2016/0241555 | A1* | 8/2016 | Vo | G06F 3/0482 |
| 2018/0096302 | A1* | 4/2018 | Tseretopoulos | H04L 63/08 |
| 2020/0411014 | A1* | 12/2020 | Asher | G10L 17/04 |
| 2022/0036904 | A1* | 2/2022 | Traynor | G10L 25/51 |

* cited by examiner

*Primary Examiner* — Cheng-Feng Huang
(74) *Attorney, Agent, or Firm* — Plumsea Law Group, LLC

(57) ABSTRACT

A remote audio signal-based method and system of performing an authentication of video of a person in order to authorize access to a secured resource. An audio security token with a first set of features is generated and stored for each user. During subsequent sessions, the system and method are configured to cause a remote computing device to play a specific audio signal while collecting audio data from a microphone of the same device. The audio data is evaluated to determine if the same features are present as in the first set of features. If the features are present, the system determines the image is authentic and can verify an identity of the person, and can further be configured to automatically grant the person access to one or more services, features, or information for which he or she is authorized.

20 Claims, 9 Drawing Sheets

AUDIO FEEDBACK-BASED VIDEO AUTHENTICATION METHOD AND SYSTEM

CROSS-REFERENCE TO RELATED APPLICATION

This application claims the benefit of U.S. Provisional Patent Application Ser. No. 63/239,036 filed on Aug. 31, 2021 and titled "Audio Feedback-Based Video Authentication Method and System", the disclosure of which is incorporated by reference in its entirety.

TECHNICAL FIELD

The present disclosure generally relates to identity authentication, and specifically to a method and system for authentication of videos of persons seeking access to one or more secured services, features, and resources. The authentication is based on generation of sound from a user device and a synchronized capture of reflected audio data by the same computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of images in order to protect user resources. The method includes a first step of obtaining, at a cloud-based authentication system, a first audio token from a first computing device, and a second step of receiving, at the authentication system and from the first computing device, a request to access a secured resource of a first user while video is streaming from the first computing device to the authentication system. The method also includes a third step of transmitting, from the authentication system and in response to the request, a first control signal to the first computing device, the first control signal including a first audio signal and a fourth step of obtaining, at the authentication system, first audio data captured by a microphone of the first computing device around the time playback of the first audio signal by a speaker of first computing device was to have occurred. In addition, a fifth step includes determining, at the authentication system, that the first audio data includes a feature set substantially similar to a feature set of the audio token so as to be classified as a match. A sixth step includes verifying, in response to the audio features matching, an authenticity of the video, and a seventh step includes granting the first user access to the secured resource for which the first user is authorized.

In another aspect, a method for detecting fraudulent attempts to obtain access to secure user data using image data is disclosed. The method includes a first step of receiving, at a cloud-based authentication system and from a first computing device, a request to access a secured resource of a first user while video is streaming from the first computing device to the authentication system. A second step includes transmitting, from the authentication system and in response to the request, a first control signal to the first computing device, the first control signal including a first audio signal, and a third step includes obtaining, at the authentication system, first audio data captured by a microphone of the first computing device around the time playback of the first audio signal by a speaker of first computing device was to have occurred. Furthermore, the method includes a fourth step of accessing, at the authentication system, a record for the first user in which a first audio token has been stored, and a fifth step of determining, at the authentication system, that the first audio data fails to include features found in the first audio token. A sixth step includes determining, in response to the first audio data failing to include features found in the first audio token, that there is a high likelihood of the request originating from a fraudulent source, and a seventh step includes denying the request and blocking access to the secured resource.

In another aspect, a system for verifying an authenticity of images in order to protect user resources includes a processor and machine-readable media. The machine-readable media include instructions which, when executed by the processor, cause the processor to obtain, at a cloud-based authentication system, a first audio token from a first computing device, and to receive, at the authentication system and from the first computing device, a request to access a secured resource of a first user while video is streaming from the first computing device to the authentication system. In addition, the instructions cause the processor to transmit, from the authentication system and in response to the request, a first control signal to the first computing device, the first control signal including a first audio signal, and to obtain, at the authentication system, first audio data captured by a microphone of the first computing device around the time playback of the first audio signal by a speaker of first computing device was to have occurred. The instructions further cause the processor to determine, at the authentication system, that the first audio data includes a feature set substantially similar to a feature set of the audio token so as to be classified as a match, verify, in response to the audio features matching, an authenticity of the video, and grant the first user access to the secured resource for which the first user is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
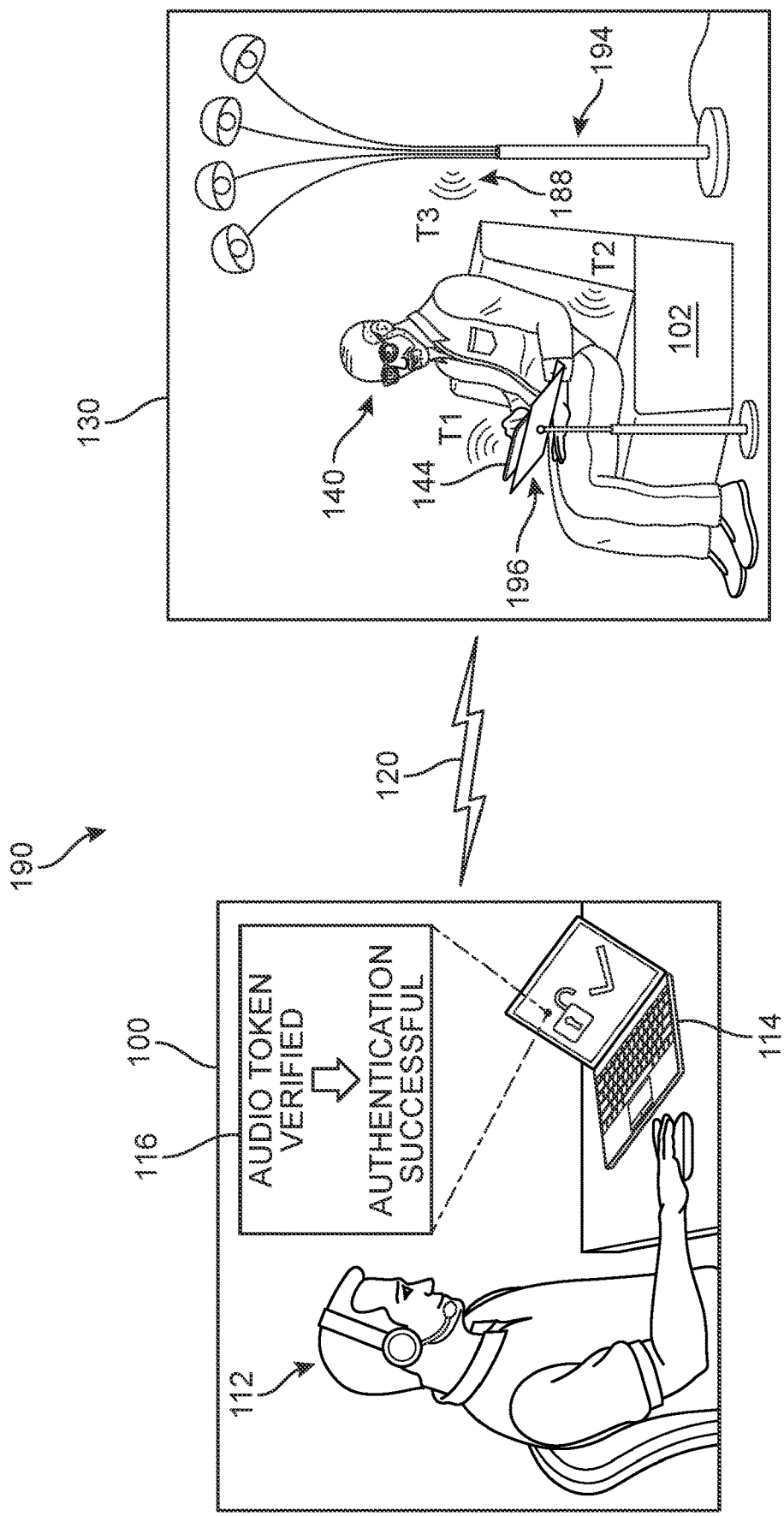
FIG. 1 is an overview of a scenario in which a computing device provides audio-based data in response to a remote signaling event in order to obtain access to a secured resource, according to an embodiment.

The embodiments provide a method and system of authenticating user videos and other streaming image data in a more secure and more efficient manner by causing a remote computing device to produce audio and then monitoring the sound around the device for an expected reflected pattern. As described in greater detail below, an authentication process and system based on sounds caused at a known user device may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image and motion sensors within computing devices in the day-to-day life of the modern consumer.

More specifically, the proposed system contemplates the use of a remote-control signal to cause a user computing device to emit a pre-designated audio stream. This can occur, for example, during a video session with a customer representative via the user device, while the user is near the device station. In some cases, the representative may manually initiate the transmission of the remote-control signal. In some embodiments, as part of an enrollment process, the authentication system generates a sound that is played through the speaker for user's device. The system records the sounds that are reflected back from objects in the user's environment and stores them for later authentication. During subsequent video-based communication sessions with an agent, the authentication system can send another remote-control signal to play the same audio from the device that is being used to conduct the communication session. In one embodiment, through the user's device, the system can "listen" for the reflected sounds and compares it to the reflected sounds recorded earlier to confirm if the sound profile matches. In some embodiments, the system would be implemented with a desktop or other stationary computing devices in which the microphones and speakers are fixed in a near constant configuration to maintain consistency of the sound profile. In cases where the location or configuration of objects in the user's room or workspace changes, the user will need to re-record an updated reflective pattern for the authentication system.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video, image, and motion recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement-relying on a particular pattern to occur in the user device in response to a remote-control signal-precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serve as a barrier to deep fake imposter attacks.

For purposes of introduction, an overview of one embodiment of the proposed systems and methods is illustrated with reference to FIG. 1. In FIG. 1, an example of an environment 190 designed with the goal of reliably authenticating a person is depicted. The environment 190 is arranged such that a person can obtain access to secured resources to which they have been granted authorization. In this example, an access management system is configured to passively verify an identify of a person so as to either permit or deny access to the user-identity dependent services provided by a first service representative ("first agent") 112 located at a remote site 100.

In addition, a first user 140 is shown with a first computing device ("first device") 144 and is seated on a sofa 102 in a first physical space 130. In FIG. 1, the first user 140 is able use first device 144 to capture and transmit audio that is produced in the environment of first physical space 130 around the first device 144. As a general matter, the first physical space 130 can refer to any physical environment such as a room in an office, residence, or other building, as well as open or outdoor spaces. In this case, the first physical space 130 is a room of a residence, such as a bedroom. During this time, the first user 140 is engaged in a communication session with the first agent 112 who is located outside of the first physical space 130, for example, at a support center location. The first agent 112 is equipped with a second computing device ("second device") 114 through which he is able to send data to and receive data from first user 140 across a network 120. In this encounter, the first agent 112 utilizes the communication support software available through her second device 114 to view images captured by cameras associated with first device 144 at first physical space 130.

In different embodiments, while the first user 140 is communicating with first agent 112, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In different embodiments, the first device 144 may include a device display ("display") that can, for example, present information and various media for a product/service support software application ("app"). In some embodiments, the app is associated with the provider of the product/service for which the service representative is offering support. In some embodiments, the first user 140 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the first device 144. In some embodiments, the user interface can include a messaging window or other chat-space by which the service representative may send messages or other digital content. Alternatively, in some embodiments, the first user 140 can also speak with a service representative via a voice calling application on first device 144, or directly through a telephone or other external device.

In an example embodiment, second device 114 is or is in communication with at least one computer system. The term "computer system" refers to the computing resources of a single computer, the partial computing resources of a single computer, a plurality of computers communicating with one another, or a network of remote servers. In one embodiment, computer system includes at least one server having at least one processor. In different embodiments, the computer system includes one or more computing devices (for example, a server) that may be in communication with one or more databases. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, the computer system may also include or be configured with access to an access management platform (see FIG. 2), of which an audio verification module ("verification module") 116 is a component. In some embodiments, the verification module may be implemented in software, hardware, or a combination thereof.

The first device 144 and/or second device 114 can include an electronics unit comprising a plurality of different components, such as a user interface component (e.g., a touchscreen display, keyboard, mouse, microphone, etc.), a sensor unit (including one or more cameras or other image-based sensors), a user interface module, a processor, and/or a communication module. Furthermore, the first device 144 may also include or be connected to a microphone and speaker. In this example, first device 144 is a computer tablet.

Thus, the first device 144 and/or second device 114 may include a system including one or more processors and memory. Memory may comprise a non-transitory computer readable medium. Instructions stored within memory may be executed by the one or more processors. The first device 144 may be configured to receive and analyze data from various sensors associated with the sensor unit in the first device 144 or data that is communicated from external components or devices to first device 144. In different examples, the sensor unit includes a variety of sensors. The sensors can include one or more of an image sensor, a light sensor, a microphone, a speaker, a touch-sensitive sensor, among others. In some cases, the first device 144 may also include a navigation system equipped with a GPS receiver that can receive GPS information or other receivers capable of receiving global or local positioning information.

A communication module may allow the first device 144 and second device 114 to communicate wirelessly, for example via network 120. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In one embodiment, first device 144 could operate in a client-server relationship with one or more servers of computer system for the authentication system. For example, the computer system may include a server that communicates with first device 144, as well as other remote devices (e.g., user devices of other customers) over a network 120. The first device 144 may provide the front-end of a system that provides users with options for performing various kinds of tasks (for example, making fund transfers when the company is a bank). In some cases, first device 144 may run client software through a web browser, in which case the client software may be hosted on a server associated with the authentication computer system. In other cases, first device 144 may run client software in the form of a native software application that has been downloaded through a centralized marketplace (i.e., an "app store"). In some cases, while the client software that allows users to perform various tasks may be run on first device 144, the data may be retrieved from and stored on databases associated with authentication computer system (e.g., databases).

In this example, it is to be understood that at a time prior to the current communication session between first user 140 and the first agent 112, the first user 140 provided audio information from the same physical space. In other words, at a previous time, the first user 140 enrolled in the authentication service by permitting his device to emit a specific audio signal, and then recording the resulting audio feedback that was reflected from objects and/or surfaces of the first physical space 130. This audio feedback was processed, stored in a database, and maintained as the first user's "audio token". For purposes of this application, an audio token refers to an audio sample that is associated with the normal environment of a user and is produced when a particular trigger sound is emitted from a device in that space. The audio token, when detected, serves to prove or otherwise support the user's claimed identity. The audio token stored for a particular user can thus vary widely and essentially can refer to any audio data that results from soundwaves reflecting on surfaces and objects in a space following playback of a preset sound. In this example, a first audio token ("first token") is obtained following the playback of a first audio signal transmitted from the access management platform of the authentication system. When the sound is emitted from speakers of first device 144, the sound travels until it 'hits' or reflects various surfaces, such as walls, and objects, such as a lamp 194 situated directly behind the user, the sofa 102, and a tablet holder or stand 196 which holds the tablet stationary in the room, collectively generating substantially unique audio feedback. In one example, the distance to each object from the microphone can cause each reflected sound to reach the microphone at a slightly different time. For example, in FIG. 1, the sound that reflects off of the tablet holder 196 is received by the microphone at a first time T1, the sound that reflects off of the sofa 102 is received at second time T2 (after T1), and the sound that reflects off of the lamp 194 is received at third time T3 (after T2). Thus, in one embodiment, the recorded audio token comprises not just reflected sounds, but the order/timing in which the sounds are received. In addition, the sound can also reflect off of the person using the computing device, nearby walls, or other surfaces around the device, creating a more secure (i.e., difficult to replicate elsewhere) token. The audio token is linked to the specific user, so that if a same or substantially similar audio is detected in the proximity of the user, the comparison can serve as a secure, reliable authentication factor that verifies the authenticity of the video.

Thus, during subsequent sessions, the authentication system can again cause the device to emit the same sound. FIG. 1 depicts such a 'subsequent' scenario. In this example, the first user 130 has requested access to an account or other secured resource of the first user. In response, in different embodiments, the remote access management system can automatically, or at the manual request of the service representative, initiate an authentication procedure, action, or task that includes a remote signaling event. As a general matter, a remote signaling event refers to the process and period during which the authentication system issues a control signal to a remote user device over a network, and the control signal causes the user device to emit a sound via a connected speaker.

In this case, the access management platform, through an audio control signal trigger module (see FIG. 2), can thereby transmit one or more audio signals to the first device 144. In one embodiment, the first device 144 is a device that is known to be associated with the first user (e.g., based on a previous device registration session). At or around the same time that the audio signal is sent, in a different but synchronized remote signaling event, the audio control signal trigger module also generates a control signal that requests or triggers a capture of a sample of audio data by a microphone of (or connected to) the first device 144.

The reflected audio feedback resulting from the audio playback is processed and a set of features are extracted that will be matched with the feature sets for audio token that had been previously captured and stored in a secure database linked to the user's account. Once a match between the current audio sample and the previously stored audio token is detected, the user's identity can be verified. In this example, audio data comprising reflected sounds 188 are received by the system and compared to the record of the audio token stored in association with a security profile for first user 140. A match between the two sources is detected, and the system automatically communicates this information to the first agent 112. In some embodiments, the system can also automatically determine based on account information for the first user 140 that first user 140 is now authorized to access her account information and/or services, and enables access. In other words, without further action or presentation of credentials by first user 140, the communication session can proceed with permitting first user 140 access to the account linked to the authenticated identity of the first user 140. The first user 140 is then able to make account requests and/or receive sensitive account information.

While in some embodiments the system may incorporate additional layers of authentication that may supplement the authentication process associated with the audio token, such as facial recognition, voice recognition, fingerprint recognition, password or pin-code verification, or other such factors, it may be appreciated that the system can be readily implemented without such additional steps. In other words, the first user 140 is able to obtain access to the desired secured resources without an identification card, debit card, or other system-provided token typically presented for such occasions. The system thereby allows the user to be passively (e.g., 'touchlessly') authenticated. In some embodiments, the system is further configured to automatically provide the user with access to the secured service linked to the user's unique account, in response to the authentication that is performed based only or primarily on the image data captured for the environment around first user 140.

Figure 2:
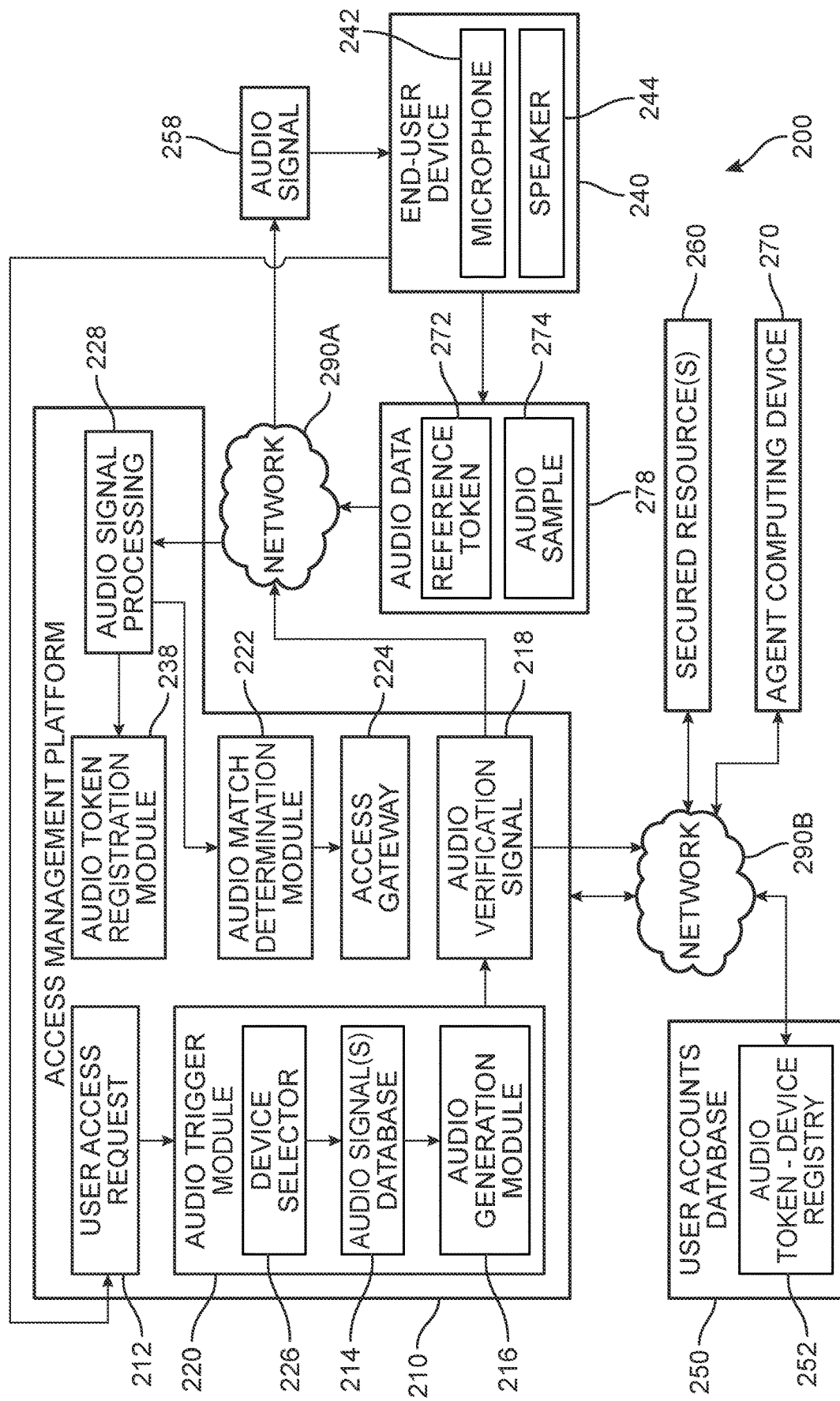
FIG. 2 is an overview of an environment of a remote generation of audio output for purposes of authentication, according to an embodiment.

For purposes of clarity, an overview of an embodiment of an authentication system architecture ("architecture") 200 is depicted in FIG. 2. It should be understood that the architecture 200 as presented is for purposes of illustration only, and other embodiments may utilize different or additional components or processes. The architecture 200 may alternatively include additional, fewer, or different components. For example, the architecture 200 may include additional storage devices, additional servers, additional computing devices, and other features not shown in FIG. 2.

In FIG. 2, the architecture 200 can be seen to include an access management platform ("platform") 210, an end-user device ("user device") 240, and an optional agent computing device ("agent device") 270. In some embodiments, the platform 210 includes or is configured to communicate with a user accounts database ("database") 250. Devices and components of architecture 200 can communicate with each other and with other components of architecture 200 over one or more networks (shown here as 290A and 290B, and referred to collectively herein as 290). The networks may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

In different embodiments, agent device 270 and user device 240, as well as platform 210 can be configured to work in conjunction with a telephony/videoconferencing application ("application") such as a telephone connection or teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, the application can be configured to present various interfaces by which administrator or other users can interact with features of platform 210. In some embodiments, the application is proprietary to the service provider for which the agent is a representative.

In different embodiments, the user device 240 includes a device display ("display") that can present information and media for a product/service, for example via a videoconferencing-chat messaging or other communication application ("app") that can connect the user with the support agent. For example, a customer can receive and send information through a user interface for the app that may be presented on the device display. The app can reside on user device 240 in some embodiments, while in other embodiments, the app can be a web-based application that is accessed from the device via network 290.

The user interface and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the user device 240. In addition, in some embodiments, when the user launches the app, they may in some cases be shown an option to initiate a screen sharing function, whereby content currently being displayed on the user device 240 is transmitted to the agent computing device 270. In some embodiments, the user interface can include a messaging window or other chat-space by which the support agent may send text messages or other digital content. Alternatively, in some embodiments, the customer can also speak with the support agent via a voice calling application on user device 240, or directly through a telephone or other external device, such as a cell phone or more general videoconferencing system.

In different embodiments, the platform 210 is capable of communicating with external devices such as agent device 270 (also referred to herein as an administrator computer) and the user device 240 (also referred to herein as the audio capture device) through the network 290 using wired or wireless communication capabilities. The platform 210 can be understood to comprise a server and, along with the agent device 270, may include computing devices comprising any number of components, such as a Network Interface Card (NIC), allowing the respective devices to receive, transmit, process, and store information obtained from the image capture devices. In other words, the architecture 200 may include groups or subgroups of computing devices that can communicate with each other, but not necessarily with the computing devices in other groups or subgroups. The architecture 200 may include computing devices of disparate types, having different types of hardware and software configurations and in a variety of different locations. In some cases, multiple devices or subsystems can be identified together as a single computing device.

In different embodiments, the platform 210 includes or is configured to access one or more databases, such as member profile or user accounts database 250. The user accounts database 250 is a content library that stores account data related to one or more users. The data may include, for a plurality of users, name, personal and professional details, current and past policy for the user, credit limit of users, security preferences, security login details, audio token(s), among other details, depending in part on the type of services being provided by the service provider. In one embodiment, user accounts database 250 includes a registry 252 of computing devices for each end-user subscribed to the audio-token authentication feature as well as the audio token associated with the device. In some embodiments, the registry 252 identifies one or more devices—each device linked to a corresponding audio token—located in the user's selected physical space (e.g., residence, workplace, vehicle, etc.). These spaces are equipped with a generally permanent or semi-permanent (stationary) computing device. The end-user has also provided consent to the system for remote access of each of these registered devices as appropriate. For example, a user may have a smart virtual assistant device (e.g., Amazon Echo®, Google Home®, etc.) in their home. The end-user can permit the system (e.g., components of platform 210 and/or agent device 270) access to their devices for authentication purposes.

In some embodiments, a user may opt to register multiple devices with his or her account. For example, the user may have one computing device and linked audio token saved in the registry 252 for when he/she is in the basement of their home, another device-token pair for when he/she is on the main floor, and another device-token at their mother's house where they are frequently visiting, etc. The user can identify the location in which the device is stationed, and the system can tag the device listing accordingly.

In addition, in different embodiments, the user may opt to provide device updates at different intervals. For example, the user may move residences or change jobs, purchase and/or replace furniture, or experience some other change that may affect the validity of the token audio as previously stored, and therefore he/she may request to submit new audio data. In other cases, the merchant or other authentication entity may require or recommend that participants provide updated audio information twice a year, once a month, or at other less or more frequent intervals to ensure the data that are stored is up-to-date. In one embodiment, the registry details and associated consent to control signals can be linked to an expiration date or period of time after which the participant will be required to provide new (current) device and/or audio data. In some embodiments, an account for the customer verifying their identification credentials can also be linked to the customer's account. Thus, a verification process may occur in conjunction with the collection of the initial computing device listing and audio token for that user, whereby the participant presents identity documents that can be used to confirm the user's identity. The user identity can then be linked to the identified device/token in the record. These devices can be accessed by platform 210 to generate verification audio, as will be discussed below.

The platform 210, agent device 270, and user device 240 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as desktops, laptops, smart phones, personal digital assistants (PDAs), portable media players, watches, glasses, laptops, notebooks, tablets, and others, and can include work stations, mainframes, non-portable computing systems, devices installed in structures, vehicles, and other types of installations.

In different embodiments, the user device 240 may further include a microprocessor, a communication unit, random access memory (RAM), non-volatile memory, a display, one or more auxiliary input/output (I/O) devices, a data port, a keyboard, a speaker 244, a microphone 242, a short-range wireless communications subsystem, a rechargeable battery, a battery interface, and possibly other components. The user device 240 may include fewer, additional, or different features, which may be arranged and may operate in the manner shown or in a different manner. The user device 240 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In some embodiments, user device 240 includes a GPS receiver that can receive GPS information or other receivers capable of receiving global or local positioning information. In other embodiments the user may communicate their location directly (e.g., via message or voice). This alleged (i.e., purported, unverified) user location information can be submitted to the platform 210 for determining to which device to transmit an authentication audio signal 258.

In different embodiments, the platform 210 is configured to receive a user request 212 for access to a secured resource 260 associated with a user account in user account database 250, which is sent to an audio trigger module 220. The audio trigger module 220 is configured to evaluate the request 212 and determine whether the purported user has previously enrolled in the audio token-based authentication process (i.e., by access to registry 252). If the audio trigger module 220 identifies registered devices on-site available in the alleged user environment, it may select a device via device selector 226 for playback of a specific sound based on the target physical space. The audio signal 258 for playback by the designated device can be selected from an audio signal(s) database 214, where the audio signal 258 corresponds to the same audio signal 258 generated during enrollment for that device and space. Thus, the audio signal(s) database 214 includes one or more audio signals that may be used for verification purposes. These signals may be a few seconds in duration, or a few minutes in duration. In some embodiments, the signals are configured to be audible, and playback will occur when both the user and agent are silent. In some other embodiments, the signals can be inaudible to the human ear, but will be picked up by the microphone 242. For example, there are sounds that have been designed to be completely inaudible to humans (40 kHz or above), yet are audible to any microphone. Such sounds combine multiple tones that, when interacting with the microphone's mechanics, create a "shadow", which is a sound that the microphones can detect. When the user device 240 emits the sound, it will be played as an inaudible signal that translates to white noise or some other sound, reflects in the room, and is captured by the microphone 242. In other embodiments, ultrasonic frequencies may also be used.

Once the device and signal have been selected, an audio generation module 216 is configured to issue a playback request control signal ("audio verification signal") 218 that includes information enabling the system to connect to the selected device, as well as the correct audio sample. As noted above, in different embodiments, the user device 240 includes microphone 242 that is linked to or otherwise integrated within a unit configured to capturing sounds in user environment. When a user requests access to a secured resource, for example via a user interface presented on user device 240 via network 290, the audio verification signal 218 may be generated by platform 210, initiating the playback of sound from the speaker 244 of user device 240.

In different embodiments, the system can include provisions to ensure or otherwise facilitate the capture of audio output from the user device for authentication purposes. In one embodiment, the agent, via agent device 270, can request (via message or voice) that the user move their face more clearly or fully into the field of view of the camera. In another embodiment, the system can be configured to automatically detect the presence of the user's face during a video session with the user. In one example, the participant's face may be out of range of a field of view of the camera, and the system can automatically present a request to the user to move into the field of view of the camera. In one embodiment, the system will show the user, on a display for the participant device, the image data being recorded so that the user can move to accommodate the view of the camera.

Furthermore, platform 210 is configured to cause the user device 240 to capture and transmit audio data 278 to remote components such as the system 250 and/or the agent device 210 via a second control signal that may be transmitted around or at the same time in order to ensure the capture of audio data at the correct time. Thus, in some embodiments, user device 240 is configured to send captured audio content (audio sample 274) to remote facilities such as the platform 210 and/or the agent device 270. In different embodiments, audio signal processing algorithms and/or software (e.g., audio signal processing module 228) may reside in user device 240, platform 210, agent device 270, and/or other devices of architecture 200 for pre-processing and processing of the captured user audio data 278. The algorithms can use some combination of time and frequency to determine whether two audio samples match. In one embodiment, the platform 210 is configured to compare the user's audio sample 274 against the reference audio (i.e., the previously stored audio token). If the samples match within certain parameters, the user is deemed to pass the authentication or verification test, indicating that the video of the user is authentic.

In different embodiments, the platform 210 is configured to extract features from the reflected acoustic echo audio sample 274 that can be used to compute the approximate shape of a room (from its response to a known sound). For example, geometric relationships between the arrival times of echoes may be used to estimate the room geometry. In one embodiment, the computation is based on the properties of Euclidean distance matrices, and can provide a substantially unique description of the space in which the computing device is stationed. In some embodiments, the system applies acoustic feedback models that are configured to reconstruct some or all of the full 3D geometry of the room from a single sound emission. This type of reconstruction can serve as the "hidden" token in an audio sample that will be compared to the "hidden" representation of the user's room in the reference audio that was previously stored.

Thus, in some embodiments, the user audio data 278 is processed and models or representations of the sample of audio are built. These models are compared against one another. In different embodiments, one or both samples may be deemed unacceptable or unusable if the sample is too loud or too soft (amplitude), or if there is too much noise (poor signal to noise ratio). If a sample is not acceptable the system may request an additional or further sample and again trigger generation of audio from the device.

If the samples are acceptable or sufficient, a scoring occurs via audio match determination module 222. The scoring process is analogous to "what is the probability that the sounds captured by the user device in response to the generated audio verification signal are the same as the verification sample that was provided during enrollment to the platform?" Thus, in some embodiments, the determination of a "match" is not necessarily based on the verification/reference sample directly or exactly matching the content of the user audio sample, but rather on the two samples being substantially similar or sharing particular features. The returned score is evaluated against a threshold value to determine if it meets or exceeds the minimum acceptable score by access gateway 224. If the score is determined to be successful, the platform 210 and/or agent may allow a user to proceed further within a call center or telephone banking menu system or other secured resource 260 being safeguarded by the service provider. In other embodiments, audio match determination module 222 can be configured such that the captured audio must directly correspond to the audio signal 258 in order for a match identification to occur.

Thus, the two audio data samples are compared by the audio match determination module 222, and if a match is found or is in an acceptable range, the access to secured resource(s) 260 by the user will be allowed and/or enabled by access gateway 224. Otherwise, access is denied, pending further verification. It can be appreciated that authentication based on audio feedback with reference to a stored audio security token strongly implies that the user's identity is true and correspondingly is in fact entitled to whatever access is being requested. It should be understood that while the platform 210 bases access decisions at least in part on the detection of the designated audio token, the system is further configured to first confirm that the user ID and optional password match based on information available in the user accounts database 250.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 270 can be connected to or include an internet customer interface for providing support specifically to customers or members who contact them via the Internet. As a general matter, support agents or service representatives can refer to any person or personnel who offers the caller (or person who was called) assistance, and has access to the platform 210 during the communication session with the customer.

In different embodiments, in order to process the enrollment of an audio token, the audio trigger module 220 can request device information, select an audio signal for that device/location from the audio signal database 214, and generate the audio verification signal 218 via audio generation module 216. In response, the user device 240 will capture the audio feedback as a reference token 272 that will be received by audio signal processing module 228 and stored in the user accounts database 250 by an audio token registration module 238 configured to link device information with audio token data under a particular user security profile.

Figure 3:
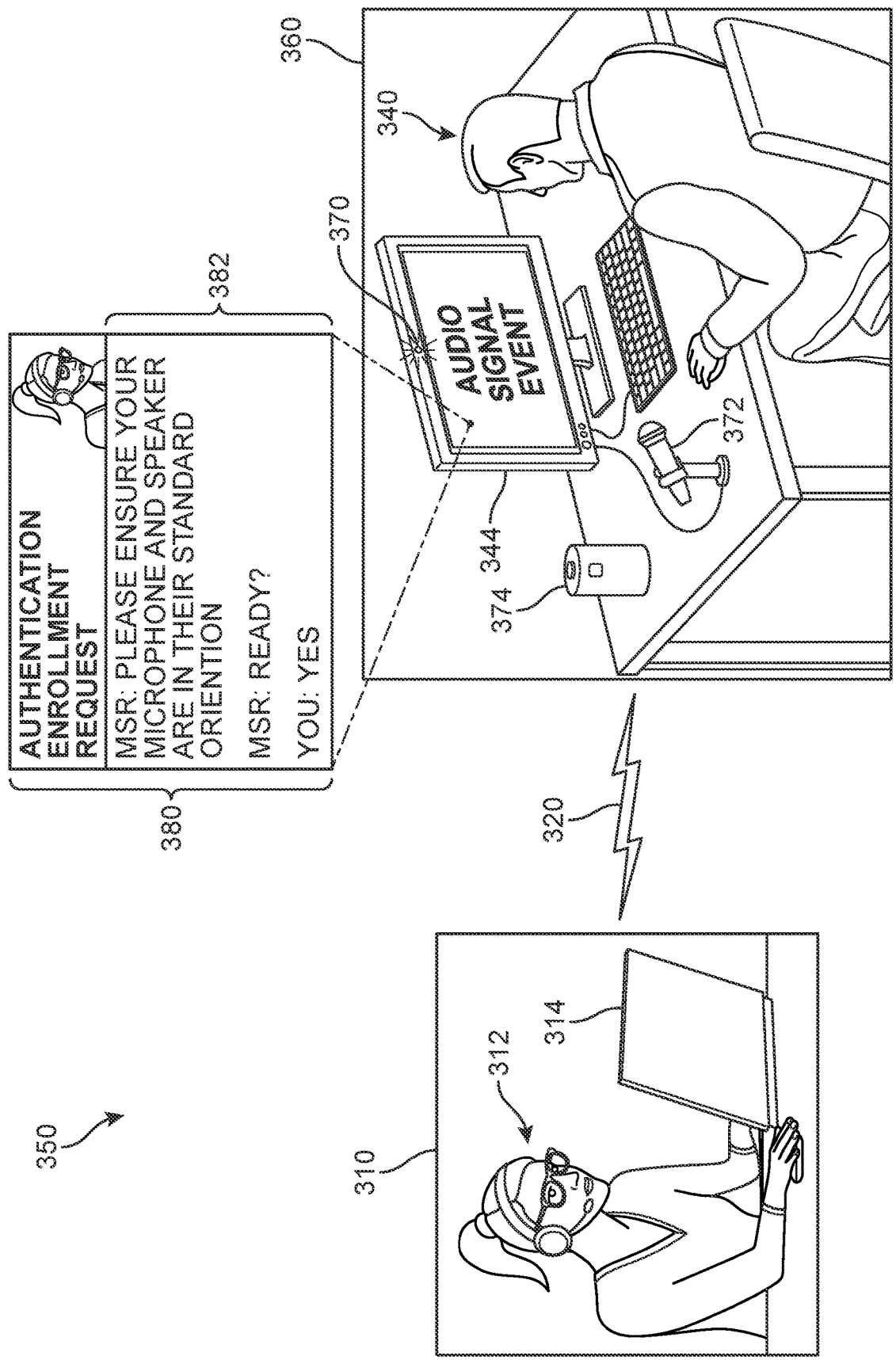
FIGS. 3-5 depict an example of a user enrolling in an audio-feedback based authentication process by providing an audio token, according to an embodiment.
Figure 4:
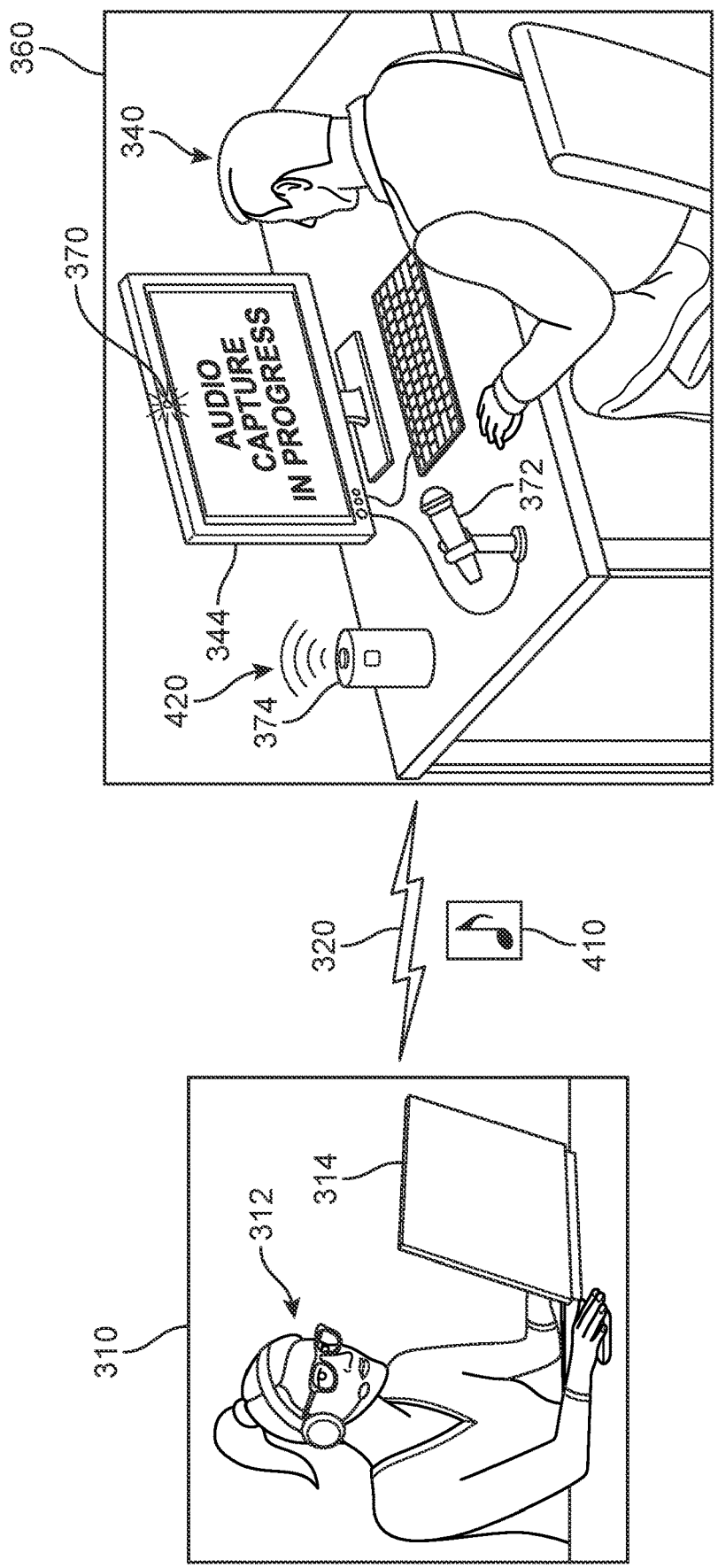
Figure 5:
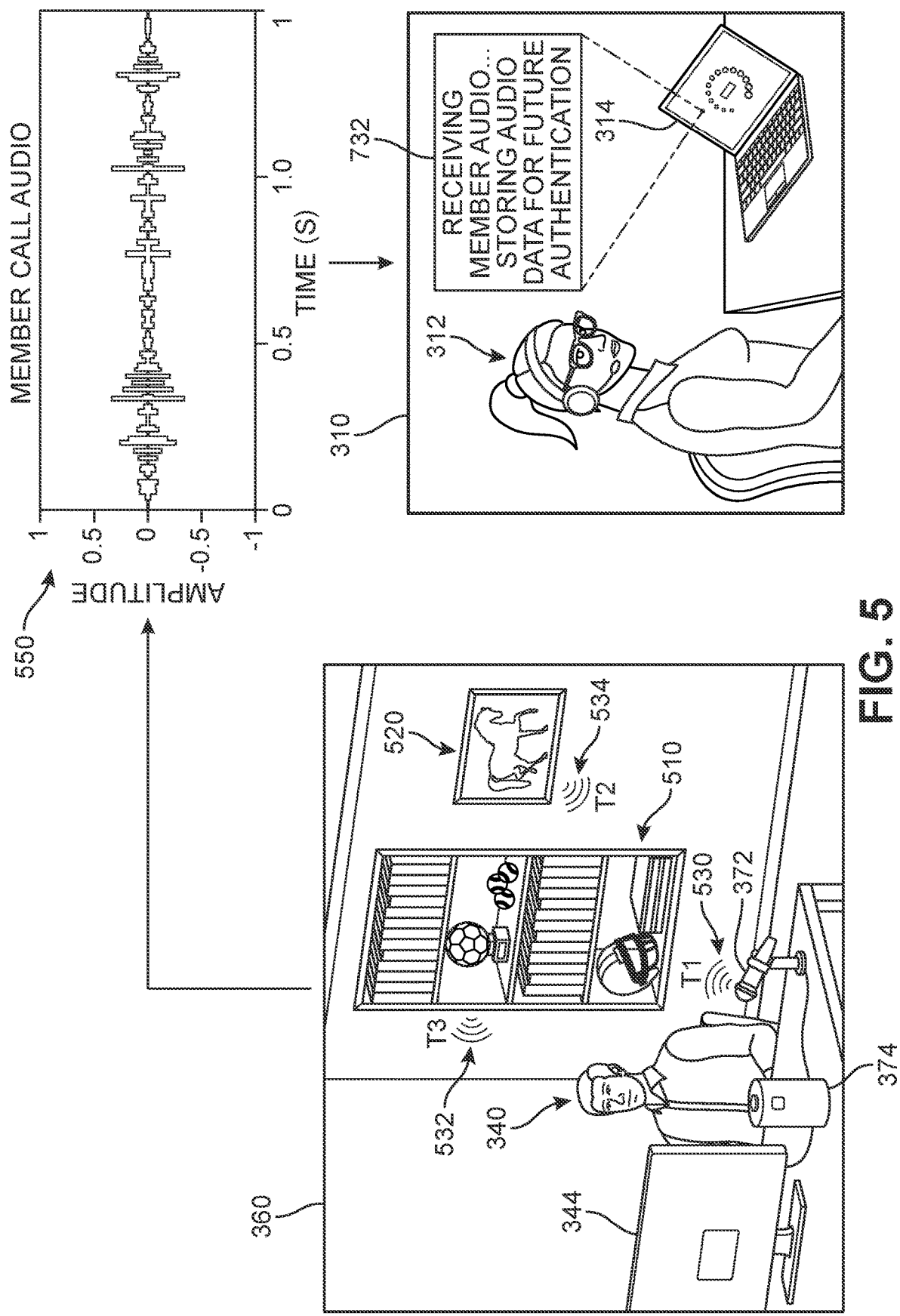

Referring now to FIGS. 3-5, an example of an enrollment or training and record acquisition session ("enrollment session") 350 for collection of data and selection of audio token(s) that may be used by some of the proposed systems is depicted. The training session 350 can, in some embodiments, be used to collect data and identify features that are present in the physical context of an individual and will then be stored in a database. In this case, a second user 340 is located in a second physical space 360 which is a home office of a residence. It should be understood that second physical space 360 can comprise any other type of space where the user resides or works or otherwise frequents, including other rooms of his or her home, meeting rooms at his or her workplace, or even a library, vehicle, outdoor space, or other place of business. However, the second physical space 360 should be chosen by the user to correspond to an environment or space that the user expects will be available to him or her during subsequent authentication sessions. While the sound data collected for a specific room is tolerant to some variances in object/furniture spatial location, the training session preferably occurs in the same location and utilizes the same device and overall room arrangement as will be used for later authentication.

In FIG. 3, the second user 340 is, via a third computing device ("third device") 344, interacting with the access management platform and communicating with a second agent 312. The second agent 312 is meeting via a fourth computing device ("fourth device") 314 located at a remote site 310. The second user 340 has requested and/or been offered the opportunity to register an audio token with his account, and is in the process of enrolling himself. In this case, a first user interface ("first interface") 380 providing a first chat window 382 allows the second user 340 to partake in an instant messaging session with the second agent 312 ("Authentication Enrollment Request-MSR: Please ensure your microphone and speaker are in their standard orientation/MSR: Ready?/YOU: Yes").

Thus, in different embodiments, a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, in some embodiments, the communication occurs in part or fully via a video conferencing interface whereby the second agent 312 and second user 340, via camera 370, speak in real-time over a video screen. Once the second user 340 provides his consent to the enrollment session, an audio playback event will be automatically triggered by the system or initiated by the second agent 312 using speakers 374, along with a synchronized audio capturing event, where audio data will be collected by a microphone 372, as shown in FIGS. 4 and 5.

One example of a possible process by which the feature sets collected during enrollment and training session(s) and subsequent authentication sessions can be processed and classified is presented simply for purposes of illustration in FIGS. 4 and 5. In FIG. 4, the authentication system has issued a first control signal 410 that causes the third device 344 to produce, via speakers 374, an audio signal 420. At or around the same time, as shown in FIG. 5, the authentication system issues a second control signal that causes the third device 344 to capture, via microphone 372, an audio recording 530. In different embodiments, the audio sample 530 can collectively comprise a set of reflected audio, such as first reflected audio 532 (echoing off of a bookcase 510), and a second reflected audio 534 (echoing off of a painting 520). The audio recording 530 is received and processed by the authentication system as an audio reference token 550. As discussed above, the audio reference token 550 includes feature sets that will serve as a reference for subsequent authentication sessions. While an agent is shown as being part of the enrollment process in FIGS. 3-5, it should be understood that the enrollment process can also occur automatically by the system.

While only one enrollment sequence is shown here, it can be appreciated that in different embodiments, a user may opt to register multiple audio tokens with his account. For example, they may have one audio token saved for when they are at home, a second audio token saved for when they are at work, a third audio token saved for when they are in their vehicle, etc. The user can identify the location in which they are calling or otherwise submitting their access request from, and the system can determine whether the audio token being detected is the correct one for that location. In addition, in different embodiments, the user may opt to provide reference data updates at different intervals. For example, the user may move residences or change jobs, or experience some other change that may affect the validity of the audio token previously stored, and therefore may request to submit new reference data. In other cases, the merchant or other authentication entity may require or recommend that participants provide new reference data twice a year, once a month, or at other less or more frequent intervals to ensure the audio token that is stored is up-to-date. In one embodiment, the audio token can be associated with an expiration date or period of time after which the participant will be required to provide new (current) audio data. In some embodiments, an account for the customer verifying their identification credentials can also be linked to the customer's audio token at or around that time. Thus, a verification process may occur in conjunction with the collection of the initial audio data, whereby the participant presents identity documents that can be used to confirm the user's identity. The user identity can then be linked to the audio token in the record. In some embodiments, the audio token(s) and/or account can be further linked to the customer's credit and/or payment details that can facilitate or even automate various retail merchandise transaction processes. In addition, in some embodiments, the record or user account may identify an authorization type or level that the customer is to be granted. For example, the customer may be authorized to access only some portion of the secured resource, depending on the audio token that is presented to the system. This can allow the user to, for example, access some resources while traveling, and the full array of resources when in a more secure location such as their own home.

Figure 6:
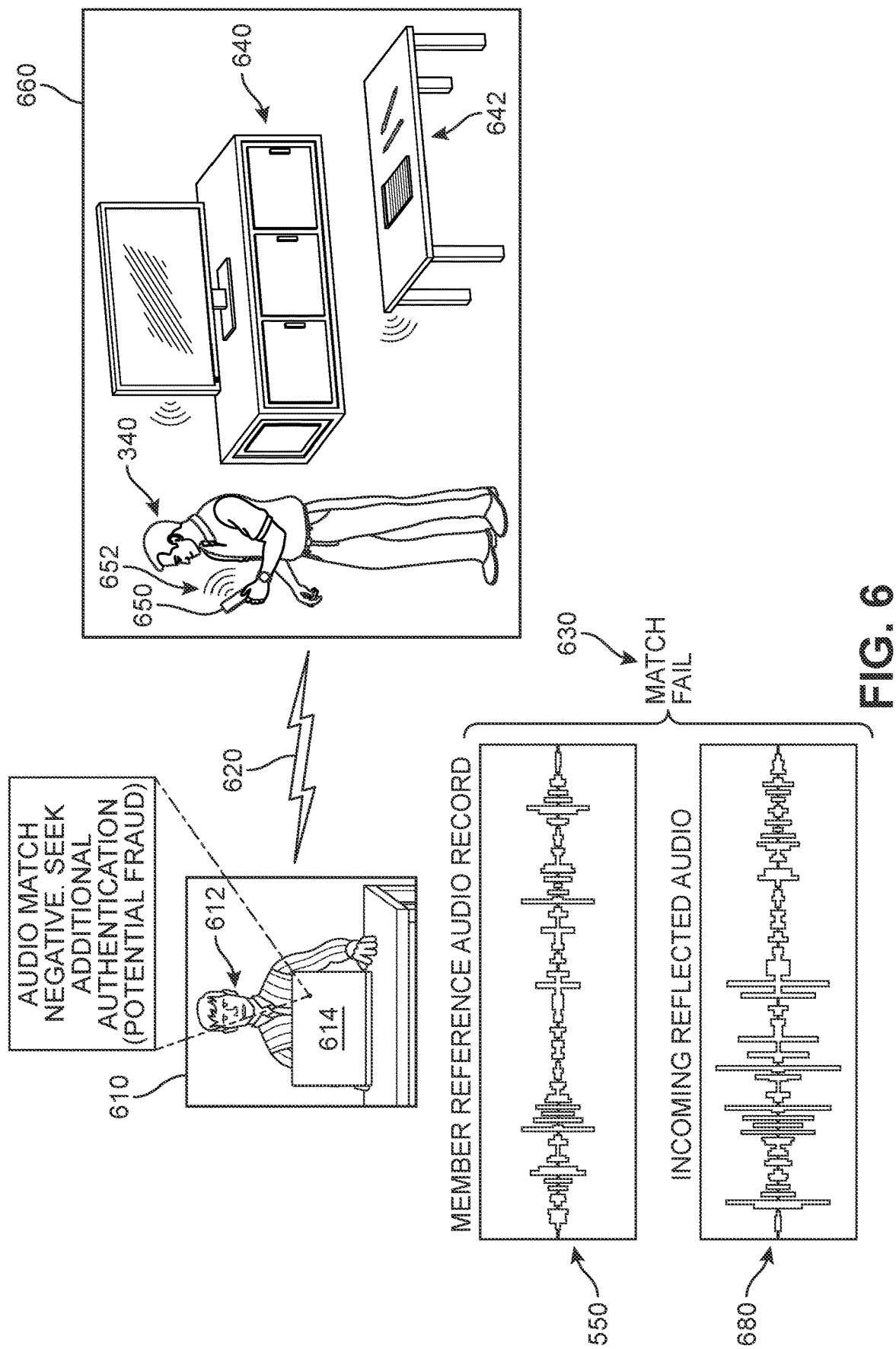
FIGS. 6 and 7 are an example of a user requesting access to a secured resource and the authentication system initiating a remote authentication event in which the audio sample fails to match the audio token, according to an embodiment.

In different embodiments, the audio data that will be collected during subsequent authentication sessions are processed in a similar manner to extract the same set(s) of features which can then be matched with the feature sets stored in the database during the enrollment session 350 based on the audio reference token 550. For purposes of illustration, an example of a scenario in which an embodiment of the proposed systems may be implemented is shown with reference to FIGS. 6-8. In FIG. 6, a third agent 612 located at a remote site 610 is engaged, via a fifth computing device ("fifth device") 614, in a video communications session ("session") with the second user 340. It can be understood that for purposes of this example, the second user 340 is the same user of FIGS. 3-5 for whom enrollment in the access management system has already occurred, while the third agent 612 may be any person or virtual agent associated with the secured resource. The second user 340 is participating in the session via a sixth computing device ("sixth device") 650, which in this case is a mobile phone. The session is occurring at a time subsequent to the enrollment stage described earlier. In other words, second user 340 has previously participated in an audio data collection session with the goal of enrolling or registering himself in this particular authentication technique, and the audio token that was acquired at that time is stored in a record in a database accessible by the depicted authentication system.

During the session, the second user 340 requests access to or actions dependent on sensitive or otherwise secured information associated with his account. In order to proceed, the access management system requires the authenticity of the video image for second user 340 be authenticated. The second user 340 can receive a reminder or other message via sixth device 650 that his designated audio token will now be detected. Because second user 340 is currently located in a third physical space 660 that differs from second physical space 360 of FIG. 3 where he had previously enrolled in the authentication system, when audio signal 652 is emitted from sixth device 650, the audio is reflected off objects and surfaces that differ from second physical space 360, including a television console 640 and a table 642. Thus, first captured audio sample 680 at this time fails to match the reference audio token 550, as represented by first waveform comparison 630.

Figure 7:
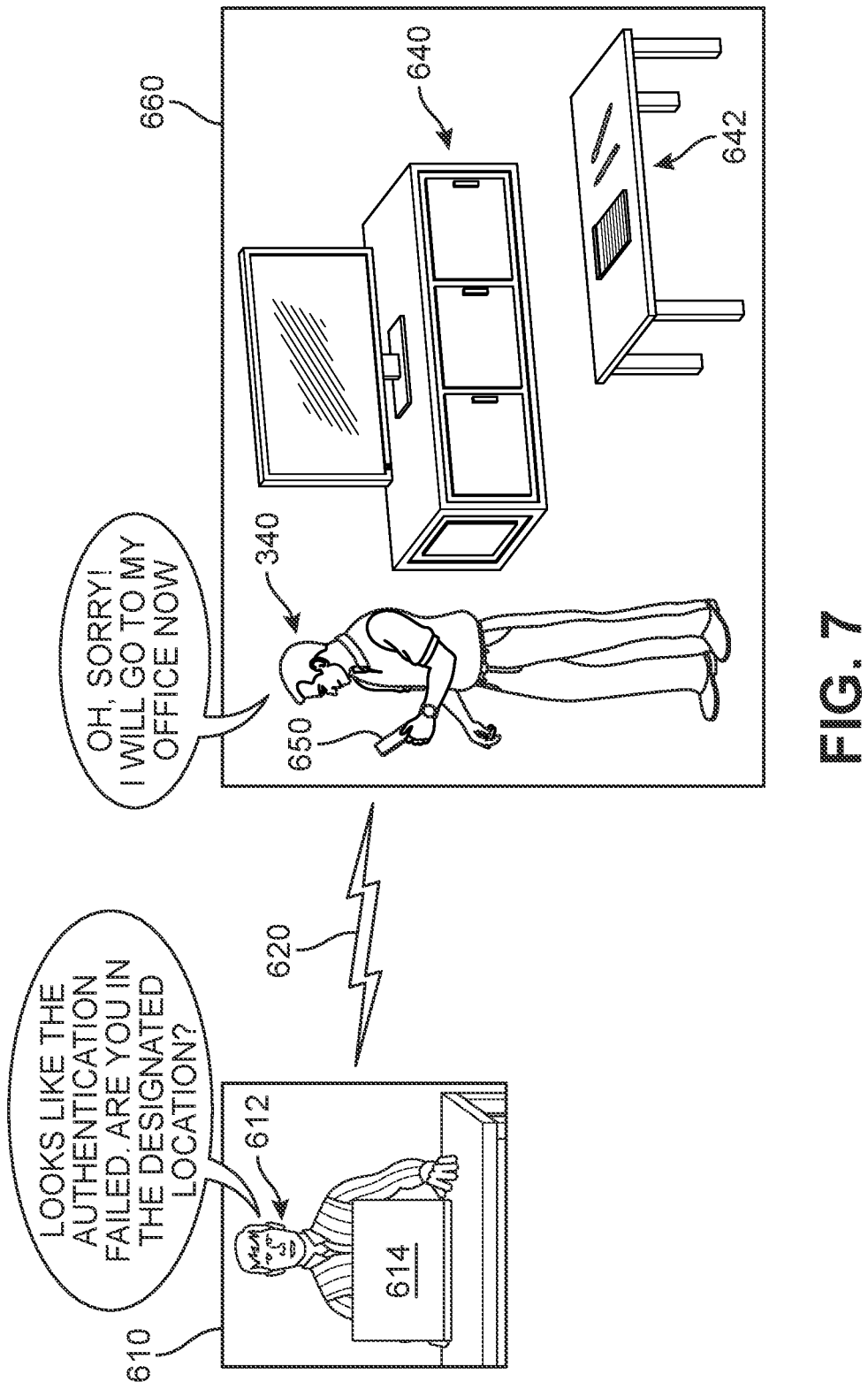

In response to this failed match, the second user 340 will be denied access to his account. Second user 340 at this time may remember he is not in the target location and must now physically move to the correct location, or be informed by third agent 612 during the call ("Looks like the authentication failed. Are you in the designated location?"), as shown in FIG. 7. The second user 340 realizes his mistake ("Oh sorry! I will go to my office now") and leaves the third physical space 660.

Figure 8:
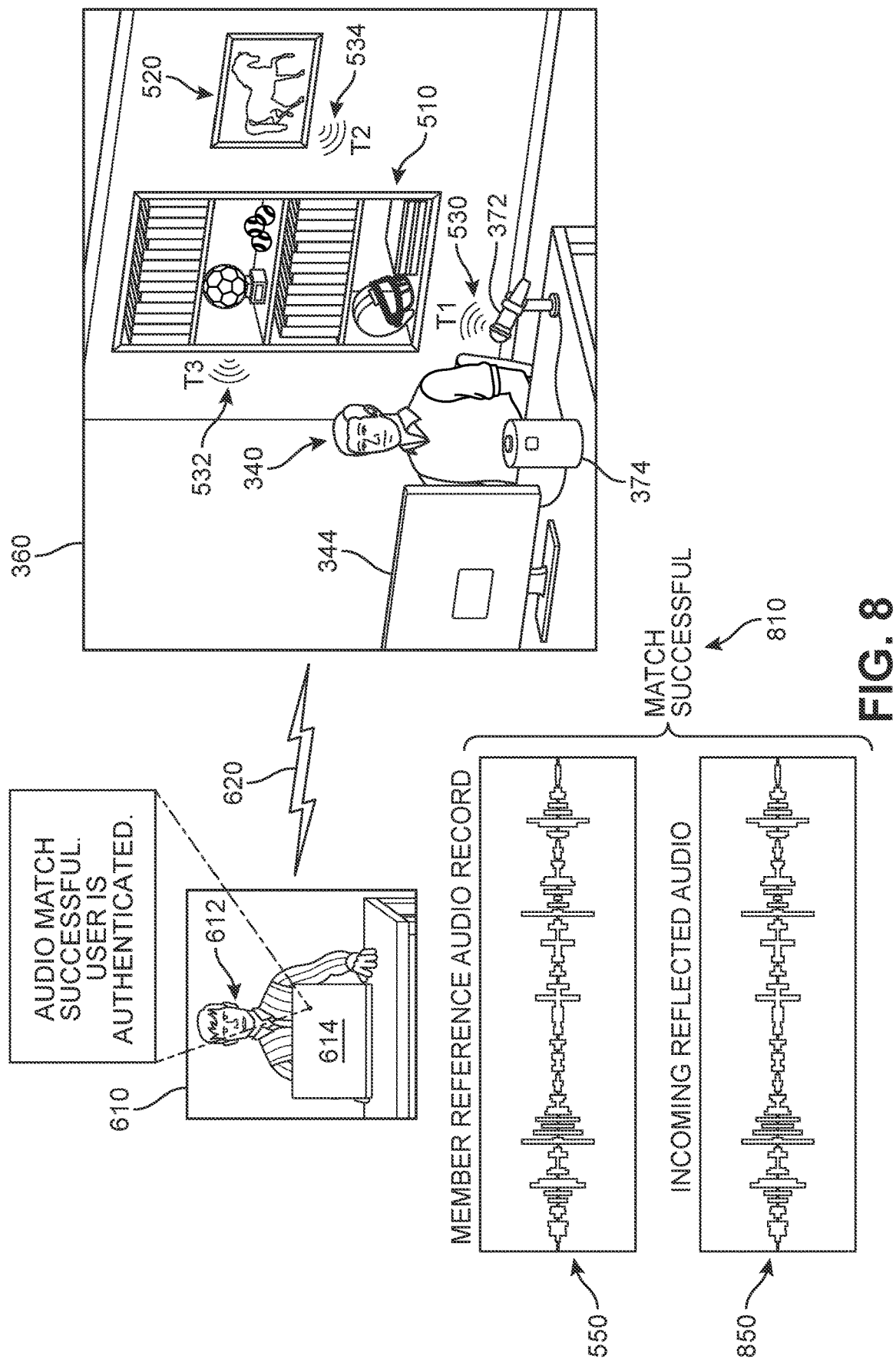
FIG. 8 depicts an example of an audio control signal causing an audio output at the user's device, and the reflected sound being compared to the previously created audio token, according to an embodiment.

In FIG. 8, the second user 340 has returned to the second physical space 360 and reinitiated the communication session via the third device 344, generally recreating the circumstances of the earlier enrollment session. Second user 340 assumes a position with third device 344 that provides a similar perspective to the previous enrollment session to the microphone 372. The audio signal is again produced, and a second captured audio sample 850 is obtained by the authentication system, which determines the second captured audio sample 850 and reference audio token 550 match one another, as shown in a waveform comparison 810. In response, in different embodiments, the system can automatically authenticate the user and release the corresponding secured resource based on this verification. In another example, the system can automatically inform the agent of the match and the agent can enable access to the secured resource. In other embodiments, the second user 340 may add other authorized users such as family members or colleagues that can be permitted to some or all of a secured resource upon detection of the same audio token.

Figure 9:
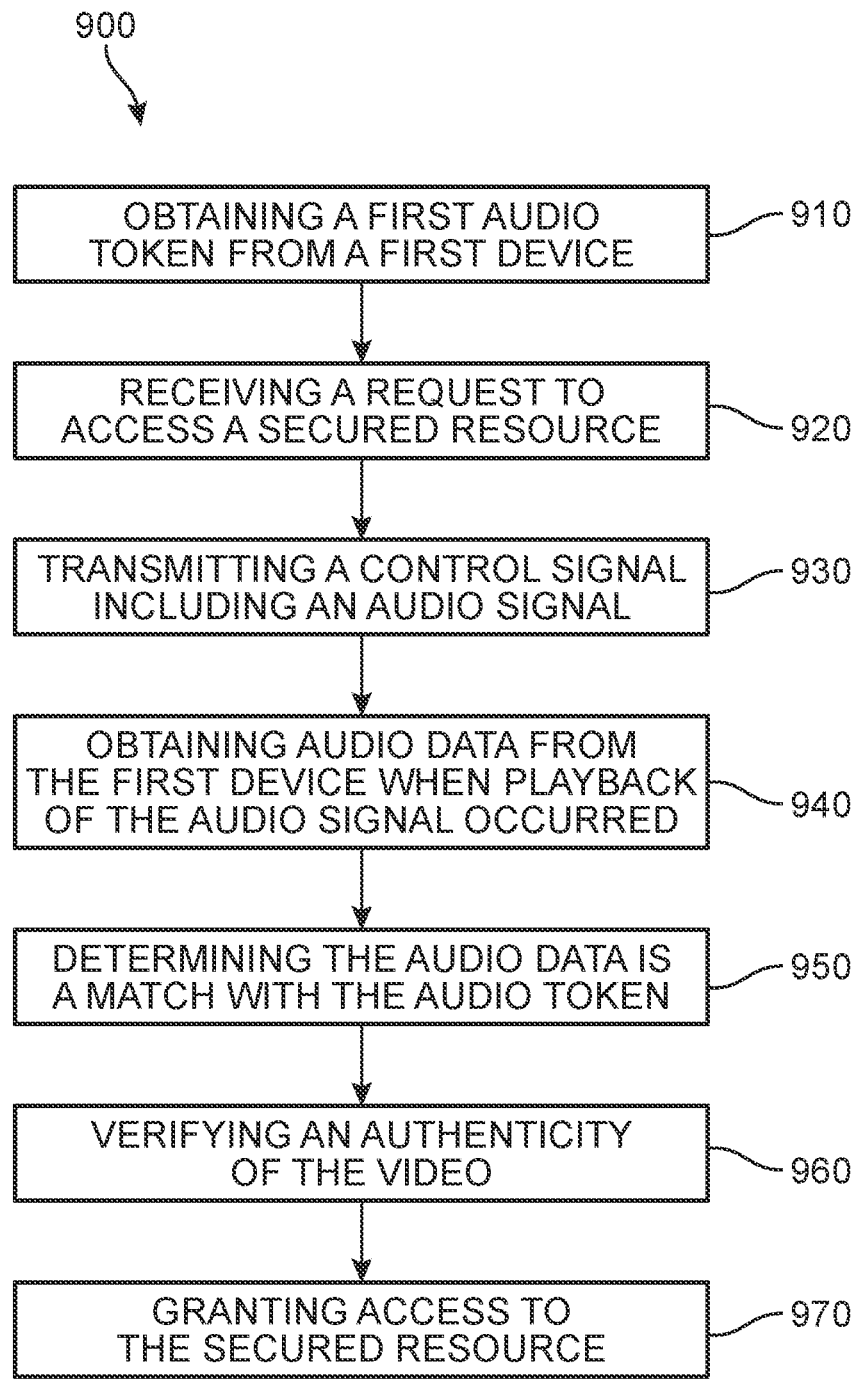
FIG. 9 is a flow chart depicting a process of verifying an authenticity of video in order to protect user resources, according to an embodiment.

FIG. 9 is a flow chart illustrating an embodiment of a method 900 of verifying an authenticity of video and/or image data in order to protect user resources. The method 900 includes a first step 910 of obtaining, at a cloud-based authentication system, a first audio token from a first computing device, and a second step 920 of receiving, at the authentication system and from the first computing device, a request to access a secured resource of a first user while video is streaming from the first computing device to the authentication system. The method also includes a third step 930 of transmitting, from the authentication system and in response to the request, a first control signal to the first computing device, the first control signal including a first audio signal and a fourth step 940 of obtaining, at the authentication system, first audio data captured by a microphone of the first computing device around the time playback of the first audio signal by a speaker of first computing device was to have occurred. In addition, a fifth step 950 includes determining, at the authentication system, that the first audio data includes a feature set substantially similar to a feature set of the audio token so as to be classified as a match. A sixth step 960 includes verifying, in response to the audio features matching, an authenticity of the video, and a seventh step 970 includes granting the first user access to the secured resource for which the first user is authorized.

In other embodiments, the method may include additional steps or aspects. In one embodiment, the first audio token was obtained around the time playback of a second audio signal occurred, and the first audio signal and second audio signal are the same. In another example, the first audio data includes audio generated by a reflection of soundwaves from surfaces around the location of the first computing device when the first audio signal is produced. In some embodiments, the first computing device is stationed in a first physical space. In such cases, the method can also include steps of obtaining, at the authentication system, a second audio token from a second computing device stationed in a second physical space, and storing the first audio token and the second audio token in a user accounts database record for the first user.

In some embodiments, the first audio token includes audio generated by a reflection of soundwaves from surfaces around the location of the first computing device when a second audio signal is produced, the second audio token includes audio generated by a reflection of soundwaves from surfaces around the location of the second computing device, and the first audio signal and the second audio signal differ. In addition, in another example, the first audio data is collected while a face of the first user is in a field of view of a camera of the first computing device. In one example, the secured resource includes one of a service, feature, and information for which access is restricted to one or more authorized persons. In one embodiment, the first audio data is obtained during a telephone or videoconferencing session between the first user and a service representative associated with the secured resource. In some embodiments, the method also includes a step of transmitting, from the authentication system and to the first computing device, a second control signal including instructions to capture audio data around the time the first audio signal was produced by the first computing device.

Other methods may be contemplated within the scope of the present disclosure. For example, in some embodiments, a method of detecting fraudulent attempts to obtain access to secure user data using image data is disclosed. The method includes a first step of receiving at a first time, at a cloud-based authentication system and from a first computing device, a request to access a secured resource of a first user while video is streaming from the first computing device to the authentication system. A second step includes transmitting, from the authentication system and in response to the request, a first control signal to the first computing device, the first control signal including a first audio signal, and a third step includes obtaining, at the authentication system, first audio data captured by a microphone of the first computing device around the time playback of the first audio signal by a speaker of first computing device was to have occurred. Furthermore, the method includes a fourth step of accessing, at the authentication system, a record for the first user in which a first audio token has been stored, and a fifth step of determining, at the authentication system, that the first audio data fails to include features found in the first audio token. A sixth step includes determining, in response to the first audio data failing to include features found in the first audio token, that there is a high likelihood of the request originating from a fraudulent source, and a seventh step includes denying the request and blocking access to the secured resource (in response to the determination that there is a high likelihood of the request originating from a fraudulent source).

In such embodiments, the method may include additional steps or aspects. In some embodiments, the method also includes a step of transmitting, from the authentication system and to the first computing device, a second control signal including instructions to capture audio data while the audio signal was generated by the first computing device. In some embodiments, the first audio data includes audio generated by a reflection of soundwaves from surfaces around the location of the first computing device when the first audio signal is produced. In one example, video is at least partially generated using deep fake technology. In some embodiments, the method also includes steps of generating a message indicating an unauthorized attempt to access the secured resource may have occurred, and automatically transmitting the message to a communication channel for the first user (i.e., an email address, SMS, in-app chat, paper letter, pop-up window, etc.). In some embodiments, the method further includes a step of obtaining, at the authentication system, the first audio token at a second time earlier than the first time and storing the first audio token in a user accounts database.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
  obtaining, at a cloud-based authentication system, a first audio token from a first computing device stationed in a first physical space;
  receiving, at the authentication system and from the first computing device, a request to access a secured resource of a first user while video is streaming from the first computing device to the authentication system;
  transmitting, from the authentication system and in response to the request, a first control signal to the first computing device, the first control signal including a first audio signal;
  obtaining, at the authentication system, first audio data captured by a microphone of the first computing device around the time playback of the first audio signal by a speaker of first computing device was to have occurred;
  determining, at the authentication system, that the first audio data includes a feature set that matches a feature set of the audio token;
  verifying, in response to the audio features matching, an authenticity of the video;

thereby granting the first user access to the secured resource for which the first user is authorized;

obtaining, at the authentication system, a second audio token from a second computing device stationed in a second physical space different from the first physical space; and storing the first audio token and the second audio token in a user accounts database record for the first user, wherein the first audio token includes audio generated by a reflection of soundwaves from surfaces around the location of the first computing device when a second audio signal is produced, the second audio token includes audio generated by a reflection of soundwaves from surfaces around the location of the second computing device, and the first audio signal and the second audio signal differ.

2. The method of claim 1, wherein the first audio token was obtained around the time playback of a second audio signal occurred, and the first audio signal and second audio signal are the same.

3. The method of claim 1, wherein the first audio data includes audio generated by a reflection of soundwaves from surfaces around the location of the first computing device when the first audio signal is produced.

4. The method of claim 1, wherein the first audio data is collected while a face of the first user is in a field of view of a camera of the first computing device.

5. The method of claim 1, wherein the secured resource includes one of a service, feature, and information for which access is restricted to one or more authorized persons.

6. The method of claim 1, wherein the first audio data is obtained during a telephone or videoconferencing session between the first user and a service representative associated with the secured resource.

7. The method of claim 1, further comprising transmitting, from the authentication system and to the first computing device, a second control signal including instructions to capture audio data around the time the first audio signal was produced by the first computing device.

8. A system for verifying an authenticity of video in order to protect user resources, the system comprising a processor and machine-readable media including instructions which, when executed by the processor, cause the processor to:
 obtain, at a cloud-based authentication system, a first audio token from a first computing device stationed in a first physical space;
 receive, at the authentication system and from the first computing device, a request to access a secured resource of a first user while video is streaming from the first computing device to the authentication system;
 transmit, from the authentication system and in response to the request, a first control signal to the first computing device, the first control signal including a first audio signal;
 obtain, at the authentication system, first audio data captured by a microphone of the first computing device around the time playback of the first audio signal by a speaker of first computing device was to have occurred;
 determine, at the authentication system, that the first audio data includes a feature set that matches a feature set of the audio token;
 verify, in response to the audio features matching, an authenticity of the video;
 thereby grant the first user access to the secured resource for which the first user is authorized;
 obtain, at the authentication system, a second audio token from a second computing device stationed in a second physical space different from the first physical space; and
 store the first audio token and the second audio token in a user accounts database record for the first user, wherein the first audio token includes audio generated by a reflection of soundwaves from surfaces around the location of the first computing device when a second audio signal is produced, the second audio token includes audio generated by a reflection of soundwaves from surfaces around the location of the second computing device, and the first audio signal and the second audio signal differ.

9. The system of claim 8, wherein the first audio token was obtained around the time playback of a second audio signal occurred, and the first audio signal and second audio signal are the same.

10. The system of claim 8, wherein the first audio data includes audio generated by a reflection of soundwaves from surfaces around the location of the first computing device when the first audio signal is produced.

11. The system of claim 8, wherein the first audio data is collected while a face of the first user is in a field of view of a camera of the first computing device.

12. The system of claim 8, wherein the secured resource includes one of a service, feature, and information for which access is restricted to one or more authorized persons.

13. The system of claim 8, wherein the first audio data is obtained during a telephone or videoconferencing session between the first user and a service representative associated with the secured resource.

14. The system of claim 8, wherein the instructions further cause the processor to transmit, from the authentication system and to the first computing device, a second control signal including instructions to capture audio data around the time the first audio signal was produced by the first computing device.

15. A non-transitory computer-readable medium storing software comprising instructions executable by one or more computers which, upon such execution, cause the one or more computers to verify an authenticity of video in order to protect user resources by:
 obtaining, at a cloud-based authentication system, a first audio token from a first computing device stationed in a first physical space;
 receiving, at the authentication system and from the first computing device, a request to access a secured resource of a first user while video is streaming from the first computing device to the authentication system;
 transmitting, from the authentication system and in response to the request, a first control signal to the first computing device, the first control signal including a first audio signal;
 obtaining, at the authentication system, first audio data captured by a microphone of the first computing device around the time playback of the first audio signal by a speaker of first computing device was to have occurred;
 determining, at the authentication system, that the first audio data includes a feature set that matches a feature set of the audio token;
 verifying, in response to the audio features matching, an authenticity of the video;
 thereby granting the first user access to the secured resource for which the first user is authorized;

obtaining, at the authentication system, a second audio token from a second computing device stationed in a second physical space different from the first physical space; and storing the first audio token and the second audio token in a user accounts database record for the first user, wherein the first audio token includes audio generated by a reflection of soundwaves from surfaces around the location of the first computing device when a second audio signal is produced, the second audio token includes audio generated by a reflection of soundwaves from surfaces around the location of the second computing device, and the first audio signal and the second audio signal differ.

16. The non-transitory computer-readable medium of claim 15, wherein the first audio token was obtained around the time playback of a second audio signal occurred, and the first audio signal and second audio signal are the same.

17. The non-transitory computer-readable medium of claim 15, wherein the first audio data includes audio generated by a reflection of soundwaves from surfaces around the location of the first computing device when the first audio signal is produced.

18. The non-transitory computer-readable medium of claim 15, wherein the first audio data is collected while a face of the first user is in a field of view of a camera of the first computing device.

19. The non-transitory computer-readable medium of claim 15, wherein the first audio data is obtained during a telephone or videoconferencing session between the first user and a service representative associated with the secured resource.

20. The non-transitory computer-readable medium of claim 15, wherein the instructions further cause the one or more computers to transmit, from the authentication system and to the first computing device, a second control signal including instructions to capture audio data around the time the first audio signal was produced by the first computing device.

* * * * *